United States Patent

Hanby

[15] 3,644,759

[45] Feb. 22, 1972

[54] SEMICONDUCTOR REPLACEMENTS FOR HOT CATHODE VACUUM AND GAS-FILLED ELECTRON TUBE DEVICES

[72] Inventor: Frederick E. Hanby, Garden Grove, Calif.

[73] Assignee: Electronic Resources, Inc., Los Angeles, Calif.

[22] Filed: Dec. 2, 1970

[21] Appl. No.: 94,411

[52] U.S. Cl. ........................307/305, 307/252 J, 307/252 N, 307/317

[51] Int. Cl. ........................................................H03k 17/00

[58] Field of Search......................315/52, 87, 92; 307/252 J, 307/252 K, 252 A, 305, 317

[56] References Cited

UNITED STATES PATENTS 3,293,449 12/1966 Gutzwiller..........................307/252 K 3,371,227 2/1968 Sylvan................................307/252 J 3,531,654 9/1970 Eby....................................315/52 X

*Primary Examiner*—John Zazworsky

*Attorney*—Spensley, Horn and Lubitz

[57] ABSTRACT

Semiconductor replacements for hot cathode vacuum and gas-filled electron tube devices such as diodes and thyratrons wherein an appropriate semiconductor device is coupled through a diode to each terminal of the terminal pair representing the heated cathode connections of the electron tube device. For electron tube diode replacements, the coupling device is one or more high-voltage semiconductor diodes. A resistor may be placed in parallel with each of the diodes connected to the cathode terminals so as to provide a leakage path for the reverse bias leakage current of the high-voltage diode. For thyratron replacement, the coupling device is a silicon-controlled rectifier, coupled to the grid terminal through a suitable coupling means.

9 Claims, 7 Drawing Figures

FREDERICK E. HANBY
INVENTOR.

BY Spensley, Horn & Lubitz
ATTORNEYS

SEMICONDUCTOR REPLACEMENTS FOR HOT CATHODE VACUUM AND GAS-FILLED ELECTRON TUBE DEVICES

BACKGROUND OF THE INVENTION

1. Field of the Invention

This invention relates to the field of semiconductor circuits for the replacement of electron tube devices.

2. Prior Art

In recent years, much of the new electronic equipment being built has been designed to use semiconductor devices, wherever possible, because of the high reliability, long life, and characteristically low power dissipation in such devices. However, there remains in service a considerable amount of equipment which has originally designed to use electron tube devices. This equipment, in most cases, is still highly serviceable equipment, its utility being substantially impaired only by the relatively short life and low reliability of the electron tube devices used therein. Consequently, since the electron tube devices characteristically are plug-in type devices, it has been found expedient to design semiconductor circuits to duplicate the function of electron tube devices, so as to economically extend the useful life of such equipment.

Various semiconductor circuits for the replacement of hot cathode electron tubes are known in the prior art. Hot cathode electron tubes, as that phrase is used herein, indicates a type of electron tube wherein the cathode is heated by a heating current passed therethrough. In such tubes, the cathode is a two-terminal device, and is normally connected in circuit through a secondary of a transformer which supplies the cathode heating power. The center tap of the secondary of that transformer forms the cathode connection equivalent to the single cathode connection on a remotely heated cathode.

One circuit which has been used as an electron tube replacement consists simply of the connection of a suitable semiconductor device between the anode terminal and one of the cathode terminals. By way of example, a high voltage diode may be connected between the anode terminal and one of the cathode terminals. With this connection, one-half of the heater voltage, which is an alternating voltage, is added to the voltage drop across the high-voltage diode, and thus, the conduction of the circuit depends not only on the anode to cathode voltage, but also on the heater voltage, and the phase thereof. For many circuits, such as in half wave rectifiers, such a circuit is a suitable replacement for an electron tube diode, and the equipment performs satisfactorily with this replacement. However, other circuits will not perform satisfactorily when such a replacement is used for an electron tube diode, and still other circuits will operate but with an undesired unbalance therein. By way of example, if two identical electron tube replacements are used in a full wave rectifier and are installed in electron tube sockets having an identical electrical connection, the rectifying characteristics of the two vacuum tube replacements may be substantially different because of the phase differences in the component of heater voltage in each tube which forms a part of the anode to cathode voltage drop. By way of example, consider a full wave rectifier application. Generally, the cathode heater voltage is a DC voltage of the same frequency and phasing as the voltage being rectified. Thus, when one tube replacement is conducting during one-half cycle, the heater voltage measured from one cathode terminal to the other cathode terminal will have a positive average value, and when the second tube replacement is conducting during the second half cycle, the heater voltage will have a negative average value. Thus, one tube replacement will give a rectified voltage which is increased by one-half of the heater voltage, and the other tube will give a rectified voltage which is diminished by one-half of the heater voltage, thereby causing an unbalance in the output of the tube replacements equal to the full heater voltage. In some circuits, this will simply create an increased load on the tube replacement having the higher output voltage, but in other circuits where balance is critical, it may result in a complete malfunction of the equipment in which it is installed.

To avoid the above problems which arise in some circuits, it would be possible to use different electron tube replacements for each of the two tubes in such circuits. Thus, if one tube replacement had a suitable semiconductor device connected to one of the cathode terminals, and the other electron tube replacement had the same semiconductor device connected to the other cathode terminal, the effect of the phase reversal of the cathode heating voltage could be eliminated in most cases. However, in general this is not a satisfactory solution because there may not be uniformity in the phasing of the cathode heater voltage as wired to the individual tube sockets within a given piece of equipment. Consequently, direct plug in of such replacements will not assure the proper or desired performance of the circuit without a prior knowledge of the specific wiring of the equipment in which the replacement is being used.

Another circuit which has been used as an electron tube replacement consists of the connection of two substantially equal resistors to the two cathode terminals of the device, and the connection of a suitable semiconductor device between the anode terminal and the center connection of the two resistors. The two resistors characteristically have substantially equal resistances, the sum of which is approximately equal to the resistance of the cathode which they simulate. This circuit is electronically very similar to the electron tube device which it replaces, and in general, will perform satisfactorily in substantially all circuits in which it is used. However, the two resistors dissipate substantially the same amount of power as the cathode of the electron tube device which it replaces, and therefore, the potentially lower power dissipation of the semiconductor device is not realized.

Still another circuit which has been used as an electron tube replacement is a circuit consisting of a connection of a suitable semiconductor device between the anode terminal and a spare terminal on the electron tube socket, and the rewiring of the chassis so as to connect the center tap of the appropriate cathode heater winding in the spare terminal. This circuit also is a satisfactory replacement for an electron tube device in substantially all equipment, once the additional wiring has been put in the equipment. However, the requirement of providing the additional wiring and the costs associated therewith make such a circuit an economically unattractive circuit in many instances.

SUMMARY OF THE INVENTION

Semiconductor replacements for hot cathode vacuum and gas-filled electron tube devices, such as diodes and thyratrons, which may be used as plug-in replacements for such devices without rewiring of the tube socket. The circuits of the present invention have an appropriate semiconductor device coupled through a diode to each terminal of the terminal pair representing the cathode connections of the electron tube device. Thus, the semiconductor coupling device is electrically coupled to the cathode terminal having the lowest instantaneous voltage. For electron tube diode replacements, the coupling device may be a high-voltage semiconductor diode. A resistor may be placed in parallel with each of the diodes connected to the cathode terminals, so as to provide a leakage path for the reverse bias leakage current of the high-voltage diode. In order to more accurately duplicate the voltage drop characteristic of a forward biased electron tube diode, the coupling device may be a number of semiconductor diodes connected in series. A resistor may be placed in parallel with each of these diodes also, so as to more uniformly proportion the reverse bias voltages between these diodes. By omitting a parallel resistor from one of the series diodes, a major part of the reverse bias voltage may be caused to occur on that diode, so that only one high-voltage diode need be used in the series combination. For a thyratron replacement, the coupling device is a silicon controlled rectifier, coupled to the grid terminal through a suitable coupling means.

DETAILED DESCRIPTION OF THE INVENTION

The present invention circuits are semiconductor circuits for the direct replacement of hot cathode electron tubes such as, but not limited to, diodes and thyratrons. These circuits allow the direct replacement of electron tube devices without rewiring of the tube sockets, and further assure satisfactory operation in circuits otherwise requiring matched electron tube devices without substantial dissipation of power, such as that required by the heater of an electron tube device.

Figure 1:
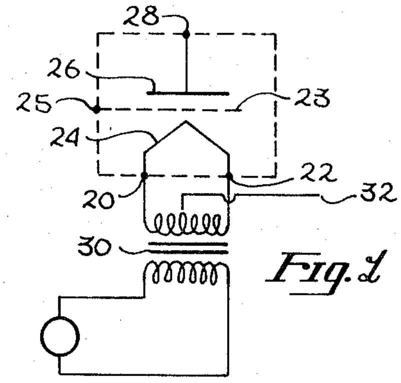
Fig. 1 PRIOR ART
FIG. 1 is a prior art schematic of a hot cathode thyratron and a conventional cathode excitation circuit.

First referring to FIG. 1, a schematic representation of a hot cathode thyratron may be seen. Such a device has terminals 20 and 22 connected internally to the cathode 24 so that a voltage applied to terminals 20 and 22 will heat the cathode 24 in the desired manner. The anode 26 is connected to a third terminal 28 which is the anode connection to the tube. The two cathode connections 20 and 22 are connected to the secondary of transformer 30 in the manner shown in the figure, and the center tap of the secondary of transformer 30 is brought out as terminal 32. The primary of transformer 30 is connected to a suitable power source (such as a 60 cycle 115 volt AC connection) so that the proper cathode heating voltage is applied to terminals 20 and 22. The center tap 32 of transformer 30 provides a voltage which is substantially equal to the average voltage of cathode 24 and is thus, used along with terminal 28, as the basic cathode and anode connections, respectively, for interconnection with an electronic circuit. The conduction in the tube is controlled by grid 23, which is connected to grid terminal 25.

Terminals 20, 22, 25 and 28 are terminals on the electron tube enclosure and are also terminals on a mating socket interconnected into the chassis of the electronic equipment. Consequently, a suitable interchangeable replacement for the electron tube device must consist of a circuit which will operate satisfactorily by making connection to terminals 20, 22, 25, and 28. (In the case of an electron tube diode, the tube will not have the grid or grid terminal, and thus, the semiconductor replacement circuit must operate by connection to terminals 20, 22 and 28.)

Figure 2:
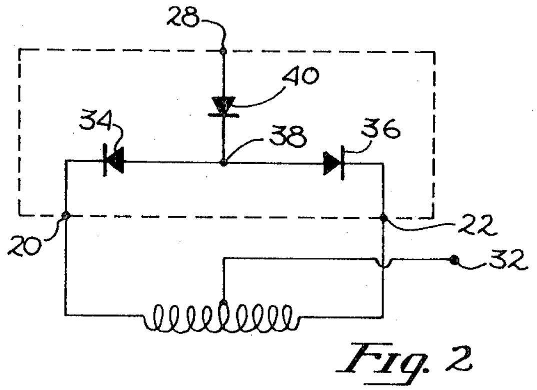
FIG. 2 is an embodiment of the present invention for replacement of a hot cathode electron tube diode, and also showing a typical circuit connected to the cathode terminals thereof.

Now referring to FIG. 2, one embodiment of the present invention for use as a replacement of a hot cathode diode may be seen within the dashed enclosure of that figure. In this circuit, diodes 34 and 36 are connected to terminals 20 and 22 respectively, and are connected to each other in back to back relationship at point 38. A third diode, diode 40, is connected between the anode terminal 28 and point 38. Thus, when the anode voltage applied to terminal 28 exceeds the voltage on either cathode terminal 20 or cathode terminal 22, conduction through diode 40 and one of diodes 34 and 36 to be appropriate cathode terminal results.

It is to be noted that the voltage at point 38 in the circuit of FIG. 2, during the conduction of the circuit is equal to the voltage drop in diode 34 or diode 36, plus the voltage at cathode terminal 20 or cathode terminal 22, whichever is lower. Thus, the voltage drop from the anode terminal 28 to the cathode terminal 32, when diode 40 is conducting, is equal to the voltage drop in diode 40, plus the voltage drop in one of diodes 34 and 36, minus one-half of the absolute magnitude of the cathode heating voltage applied between terminal 20 and terminal 22 by the secondary of transformer 30. This is to be compared to the voltage drop characteristic of the electron tube device of FIG. 1, wherein, to the extent that the cathode is a symmetrical element so that the average cathode voltage is equal to the voltage of cathode terminal 32, the voltage drop from the anode 28 to the cathode terminal 32 is simply the voltage drop between the anode 26 and the cathode 24. Though the specific anode to cathode voltage drop of a particular electron tube device may be duplicated in the circuit of FIG. 2 by the substitution of a suitable number of diodes in series in place of diode 40, there will still remain a voltage component between anode terminal 28 and cathode terminal 32 due to the rectification of the heater voltage by diodes 34 and 36, not characteristic of the electron tube device which it replaces. However, it has been found that this additional voltage component does not affect the operation of most circuits, including those circuits hereinbefore requiring a matched pair of electron tube device. Though the specific reasons for this undoubtedly vary from circuit to circuit, it should be noted that in many circuits, the frequency of the signal being rectified by the electron tube diode is equal to the frequency of the cathode heater excitation. Thus, because of the rectification of diodes 34 and 36, the average component of voltage between anode terminal 28 and cathode terminal 32 due to the cathode heater voltage is the same throughout one-half cycle of operation as it is throughout the next half cycle of operation. Therefore, the circuit of FIG. 2, when used in pairs, will perform as matched pairs, because of the effective full wave rectification of the cathode heater voltage by diodes 34 and 36.

The above result is to be compared with the result which would be achieved if only a single diode were used in the replacement circuit, such as a diode connected between anode terminal 28 and cathode terminal 22. In that case, the cathode heater voltage would appear without rectification as a component of voltage between the anode terminal 28 and the cathode terminal 32, thereby subtracting a component of voltage throughout one-half cycle of heater excitation and adding component of voltage throughout the other half cycle of heater excitation.

It should be noted that the same result as achieved with the circuit of FIG. 2 might also be achieved by suitably connecting a single diode between terminals 28 and 20 and a second identical diode between terminals 28 and 22. However, such a circuit would require two high voltage diodes instead of a single high-voltage diode 40, and would also require nearly twice as many diodes if a plurality of diodes connected in series were used to duplicate the forward voltage drop characteristic of electron tube devices.

Figure 3:
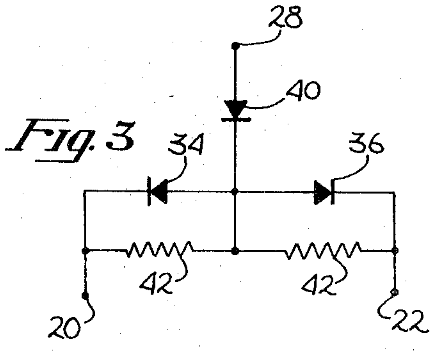
FIG. 3 is a circuit diagram showing an alternate embodiment of a hot cathode electron tube diode replacement.

In order to use low voltage diodes for diodes 34 and 36 without risking damage to these diodes by the leakage current of diode 40 when back biased, an alternate embodiment of the present invention, as shown in FIG. 3, may be used. In this embodiment, resistors 42 are used to bleed off the leakage current of diode 40 so that the leakage current does not result in high voltages imposed on diodes 34 and 36. Characteristically, the leakage current of diode 40, when back-biased, is relatively low. Therefore, resistors 42 may be relatively high valued resistors, thus creating negligible power loss due to the cathode heater excitation between terminals 20 and 22, while still providing adequate protection of diodes 34 and 36. In essence, these resistors, in conjunction with a resistance equal to the back e.m.f. applied to diode 40 divided by the leakage current therein, form a voltage divider, and may be chosen to be 10 percent or less of that equivalent leakage resistance so that the breakdown voltage of diodes 34 and 36 need only be 10 percent or less of that of diode 40.

Figure 4:
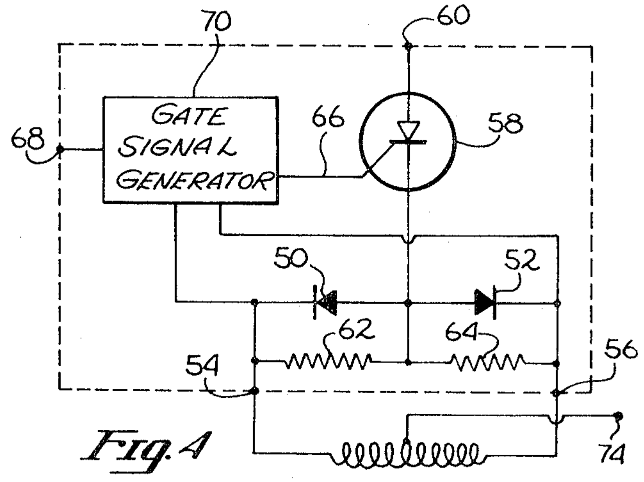
FIG. 4 is a circuit diagram showing a further embodiment of the present invention for use as a replacement for hot cathode electron tube thyratrons.

Now referring to FIG. 4, another alternate embodiment of the present invention may be seen. In this figure, the semiconductor circuit within the dashed line is a suitable replacement for a thyratron. The circuit is comprised of a pair of diodes 50 and 52 connected to the cathode terminals 54 and 56 in back to back relationship, and a silicon controlled rectifier 58 connected between the anode terminal 60 and the common between the two diodes 50 and 52. Leakage current bleeder resistors 62 and 64 provide a leakage path for the leakage current through the silicon controlled rectifier 58 when back biased at high voltages, so that the high voltage is not imposed on diodes 50 and 52 also. The gate 66 of the silicon controlled rectifier 58 is connected to the grid terminal 68 through a gate signal generator 70, which generally is adapted to match the impedance and voltage characteristics of the equivalent thyratron with the gating requirements of the silicon controlled rectifier 58.

Various forms of gate signal generators may be used, such as a blocking oscillator of the type disclosed in my copending application entitled *Blocking Oscillator With Extended Variable Pulse*, docket number P–35/003, assigned to the same assignee. Such circuits are normally designed to use the cathode heater excitation for the primary source of power, so that the circuit does not require additional connections other than those already wired into the thyratron tube socket.

The circuit shown in FIG. 4, and particularly the pair of diodes 50 and 52, function in much the same manner as has been hereinbefore described. In particular, the diodes 50 and 52 alternately connect the cathode 72 of the silicon controlled rectifier 58 to the cathode terminal 54 or 56, whichever has the lowest instantaneous voltage. Therefore, the voltage drop between the anode terminal 60 and the cathode terminal 74 is equal to the voltage drop in the silicon controlled rectifier 58 minus one-half the absolute magnitude of the cathode heater voltage between terminals 54 and 56. Thus, as before, there is a component of voltage between the anode terminal 60 and the cathode terminal 74 due to the rectification of the cathode heater voltage which is not present in an ordinary thyratron. However, this component of voltage does not affect the triggering level for the SCR since the gate signal generator generates a triggering signal sufficient to trigger the SCR independent of the phasing of the cathode heater voltage. Also, normally the frequency of excitation of the heater is the same as the frequency of the signal being rectified by the thyratron, so that a system requiring two thyratrons for rectification of alternate half cycles will remain balanced when using thyratron replacements as shown in FIG. 4, irrespective of the wave shape of the triggering signal of the gate signal generator.

Figure 5:
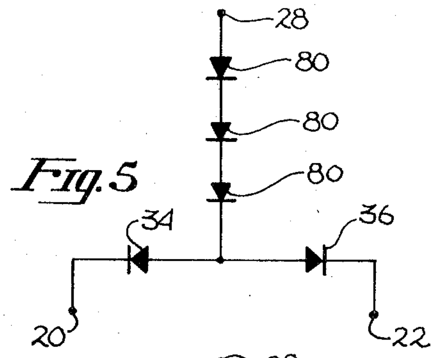
FIG. 5 is a circuit diagram showing a further alternate embodiment of the hot cathode electron tube diode replacement of FIG. 2, having electrical characteristics more nearly approximately those of the electron tube.
Figure 6:
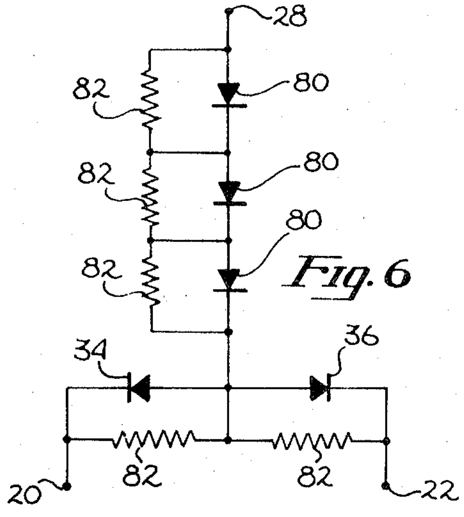
FIG. 6 is a circuit diagram showing an alternate embodiment of the hot cathode electron tube diode replacement of FIG. 5, having a provision for uniformly distributing the reverse bias voltages between the various diodes within the circuit; and, FIG. 7 is a circuit diagram showing a further alternate embodiment of the hot cathode electron tube diode replacement of FIG. 5, having a provision for assuring that the major part of a reverse bias voltage will be imposed on a specific diode in the circuit.

It is to be understood that the present invention is not limited to the specific semiconductor coupling devices hereinbefore disclosed, but may be used with a variety of coupling devices to duplicate the electrical characteristics of various hot cathode electron tube devices, or to more accurately duplicate the electrical characteristics of an electron tube diode or thyratron. Thus, in the circuit of FIG. 5, a plurality of diodes 80 are connected in series so as to more accurately approximate the voltage drop in an electron tube during the conduction portion of the cycle. The circuit of this figure, and its operation, are in all other respects identical to that of FIG. 2. If desired, resistors 82 may be placed in parallel with each diode, as shown in FIG. 6, so as to assure a fairly uniform distribution of the peak reverse bias voltage on each diode. By so doing, the total reverse bias capability of the circuit approaches the sum of the reverse bias capabilities of each diode.

Figure 7:
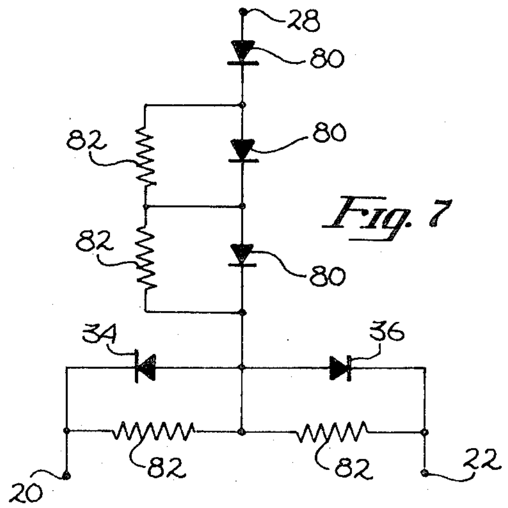

As a further variation of the present embodiment, one of resistors 82 of FIG. 6 may be eliminated, as shown in FIG. 7. In this case, most of the reverse bias voltage on the circuit will appear across the diodes not having the parallel resistor connected thereto and thus only one high voltage diode need be used. It is thus apparent, that while the invention has been particularly shown and described with reference to preferred embodiments thereof, it will be understood by those skilled in the art that various changes may be made therein without departing from the spirit and scope of the invention.

I claim:

1. In a semiconductor circuit for use as a direct plug-in replacement for a hot cathode electron tube device, each having at least a first and a second cathode terminal and an anode terminal the combination comprising: first and second semiconductor diodes and a semiconductor coupling means;
   said first and second diodes each having first and second leads and being conductive when said first lead is at a higher voltage than said second lead;
   said first leads of said first and second diodes being coupled to each other and to said semiconductor coupling means;
   said second lead of said first diode being coupled to said first cathode terminal;
   said second lead of said second diode being coupled to said second cathode terminal; and,
   said coupling means being further coupled to said anode terminal.

2. In the circuit of claim 1, first and second resistors;
   said first and second leads of said first diode being coupled through said first resistor; and
   said first and second leads of said second diode being coupled through said second resistor.

3. In the circuit of claim 1 for use as a direct plug-in replacement for a hot cathode electron tube diode, wherein said coupling means comprises a semiconductor diode;
   said coupling means having first and second leads and being conductive when said first lead is at a higher voltage than said second lead;
   said first lead of said coupling means being coupled to said anode terminal; and
   said second lead of said coupling means being coupled to said first leads of said first and second diodes.

4. In the circuit of claim 3, first and second resistors;
   said first and second leads of said first diode being coupled through said first resistor; and
   said first and second leads of said second diode being coupled through said second resistor.

5. In a semiconductor circuit for use as a direct plug-in replacement for a hot cathode electron tube diode, each having at least first and second cathode terminals and an anode terminal, the combination comprising first and second semiconductor diodes and a plurality of additional semiconductor diodes;
   said first and second diodes each having first and second leads and being conductive when said first lead is at a higher voltage than said second lead;
   said first leads of said first and second diodes being coupled to each other;
   said second lead of said first diode being coupled to said first cathode terminal;
   said second lead of said second diode being coupled to said second cathode terminal; and,
   each of said additional diodes being coupled in series between said anode terminal and said first leads of said first and second diodes, so as to be conductive when said anode terminal is at a higher voltage than said first leads of said first and second diodes.

6. In the circuit of claim 5, first and second resistors and additional resistors numbering one less than said additional semiconductor diodes;
   said first and second leads of said first diode being coupled through said first resistor;
   said first and second leads of said second diode being coupled through said second resistor; and, each of said additional resistors being coupled in parallel with one of said additional semiconductor diodes, thereby leaving one of said last named diodes without a resistor coupled in parallel thereto.

7. In the circuit of claim 5, first and second resistors and additional resistors numbering the same as said additional semiconductors diodes;

said first and second leads of said first diode being coupled through said first resistor;

said first and second leads of said second diode being coupled through said second resistor; and, each of said additional resistors being coupled in parallel with one of said additional semiconductor diodes, thereby leaving one of said additional semiconductor diodes, thereby leaving one of said last named diodes without a resistor coupled in parallel thereto.

8. In a semiconductor circuit for use as a direct plug-in replacement for a hot cathode electron tube grid controlled device, each having at least first and second cathode terminals, an anode terminal, and a grid terminal, the combination comprising first and second semiconductor diodes, a coupling means, and a silicon controlled rectifier having an anode connection, a cathode connection and a gate connection;

said first and second diodes each having first and second leads and being conductive when said first lead is at a higher voltage than said second lead;

said first leads of said first and second diodes being coupled to each other and to said cathode connection of said silicon controlled rectifier;

said second lead of said first diode being coupled to said first cathode terminal;

said second lead of said second diode being coupled to said second cathode terminal;

said anode connection of said silicon controlled rectifier being coupled to said anode terminal; and said gate connection of said silicon controlled rectifier being coupled to said grid terminal through said coupling means, said coupling means being a means responsive to a signal applied to said grid terminal for providing a gate signal to said gate connection.

9. In the circuit of claim 8, and second resistors;

said first and second leads of said first diode being coupled through said first resistor; and, said first and second leads of said second diode being coupled through said second resistor.

* * * * *